Nov. 4, 1958 L. A. CUMMARO 2,858,601
TOOL FOR INSTALLING A THREADED FASTENING
ELEMENT AND LOCKING MEMBER
Filed March 14, 1955 2 Sheets-Sheet 1
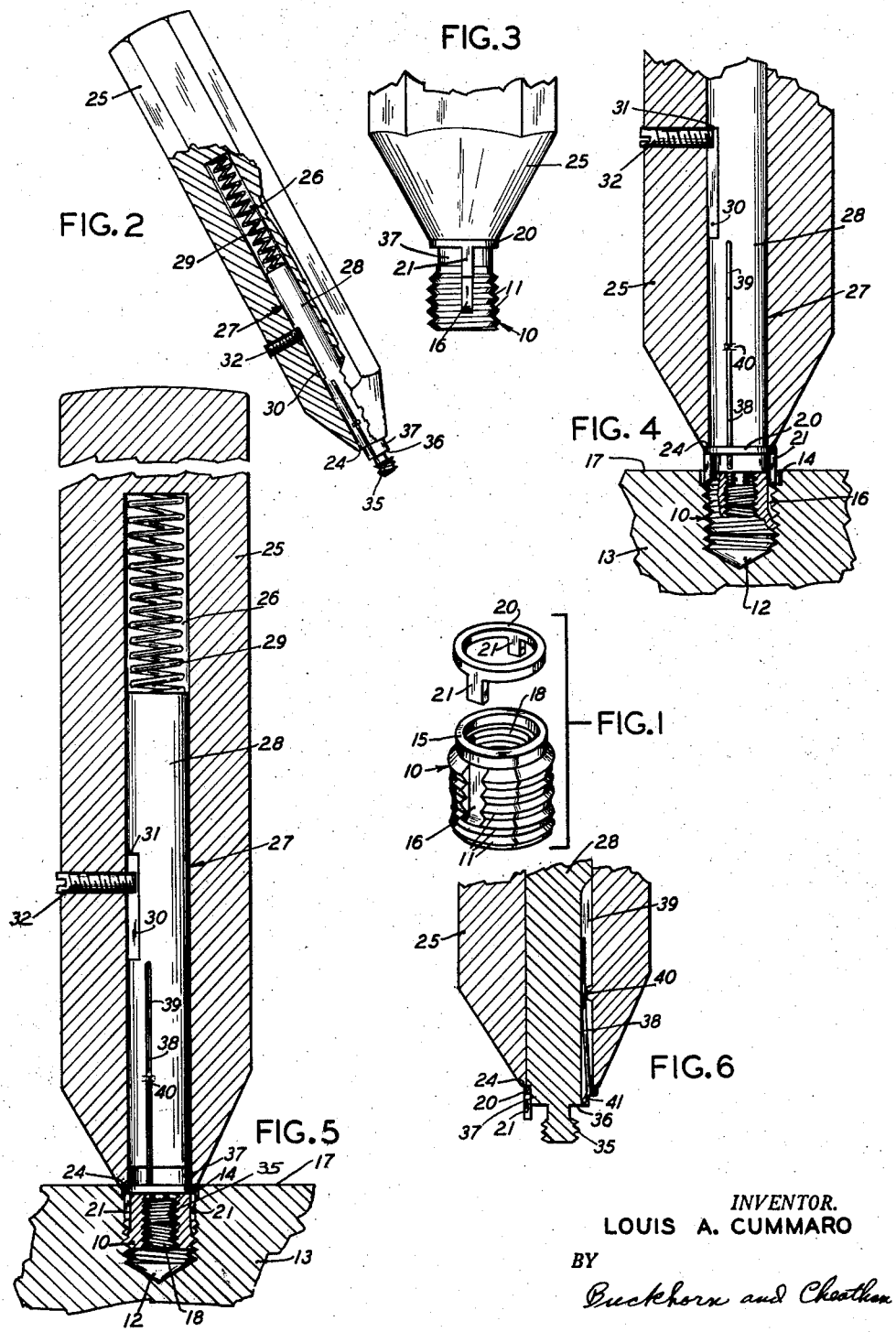
INVENTOR.
LOUIS A. CUMMARO
BY
Buckhorn and Cheatham
ATTORNEYS

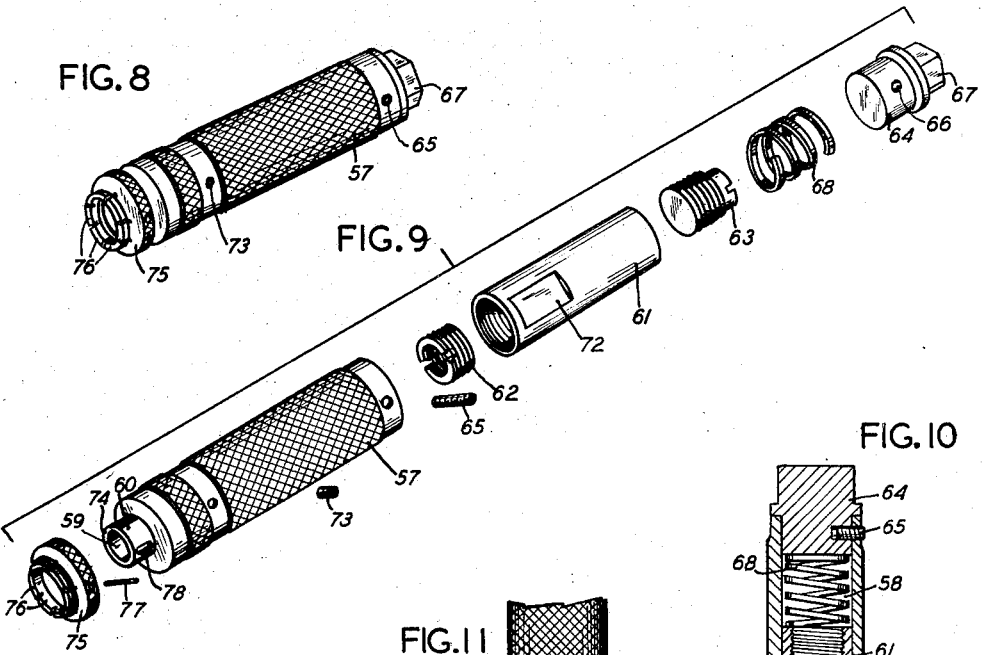
Nov. 4, 1958 — L. A. CUMMARO — 2,858,601
TOOL FOR INSTALLING A THREADED FASTENING ELEMENT AND LOCKING MEMBER
Filed March 14, 1955 — 2 Sheets-Sheet 2
INVENTOR.
LOUIS A. CUMMARO
BY
Buckhorn and Cheatham
ATTORNEYS United States Patent Office 2,858,601
Patented Nov. 4, 1958

2,858,601

TOOL FOR INSTALLING A THREADED FASTENING ELEMENT AND LOCKING MEMBER

Louis A. Cummaro, Bronxville, N. Y., assignor to Phillips Screw Company, New York, N. Y., a corporation of Delaware Application March 14, 1955, Serial No. 494,137

8 Claims. (Cl. 29—240)

The present invention relates to a tool for installing a threaded device in a parent body and for thereafter driving home a locking member to lock the device in said body.

A threaded device which the tool is adapted to install comprises an insert tubular in form, having external threads for engagement in a tapped aperture formed in a body of soft material and having internal threads for receiving a screw or bolt which it is desired to anchor in the soft material. The insert is locked in place by a locking member including a ring which fits around the top portion of the insert and a pair of keys which are adapted to engage within grooves formed through the external threads of the insert, the keys being adapted to be driven into the grooves after the insert is installed in the parent body thus to cut keyways in the parent body so that the locking member, and consequently the insert, are locked against rotation relative to the body.

It is a general object of the invention to provide a tool for use in screwing a threaded device into another member and for thereafter driving a locking element between the device and said member.

It is another principal object of the invention to provide a tool for enabling the quick and easy installation of a fastening device into a parent body with the subsequent driving home of the locking member in the desired position between said body and device.

More particularly it is an object of the invention to provide a tool having means for screwing an insert as described above into the body aperture, and further means for holding the locking member with the keys in alignment with the grooves of the insert so that the locking member may be subsequently driven into correct position upon the insert.

Other objects and advantages of the invention will become more apparent hereinafter.

In accordance with the present invention, there is provided a tool upon which the threaded device and locking member may be assembled and the tool utilized to screw the device into a parent body aperture. Means are provided on the tool for holding the locking member in correct alignment with the device and further means are provided for enabling the driving home of the locking member after the device has been installed in the aperture.

For a more detailed description of the invention, reference is made to the accompanying drawings, wherein:

Fig. 1 is an exploded perspective view of an insert and locking member adapted to be installed by the tool of the invention;

Fig. 2 is a perspective view, partially in section, of a tool for installing tubular inserts and locking members such as shown in Fig. 1;

Fig. 3 is an enlarged, fragmentary view showing the tool with the insert and locking member mounted thereon prior to installing the insert in a parent body;

Fig. 4 is a fragmentary, sectional view of the tool rotated 90° from Fig. 3 and showing the insert installed in a parent body prior to driving the locking member home;

Fig. 5 is a sectional view similar to Fig. 4 showing the tool after the locking member has been seated in place;

Fig. 6 is a fragmentary, sectional view of the tool showing a detail thereof;

Fig. 7 is an exploded perspective view of a stud and locking member therefor which a tool of the invention is adapted to install;

Fig. 8 is a perspective view of a tool for installing such studs and locking members therefor;

Fig. 9 is an exploded perspective view of the tool of Fig. 8;

Fig. 10 is a longitudinal section of the assembled tool of Fig. 8;

Fig. 11 is a fragmentary, cross-sectional view of the tool rotated 90° from Fig. 10 with the stud and locking member mounted thereon prior to installing the stud in a parent body;

Fig. 12 is an enlarged view similar to Fig. 11 showing the tool with the stud installed in the parent body prior to driving the locking member home; and Fig. 13 is a view showing the tool after driving the locking member home about the stud.

The tool illustrated in Figs. 2 to 6, inclusive, is shown as constructed for installing a tubular insert 10 such as shown in Fig. 1 and adapted to be installed in a threaded aperture 12 formed in a parent body 13, the aperture being counterbored as indicated at 14 to a predetermined depth. The insert 10 is provided with external threads 11 for engaging the threads of the aperture 12 and is formed with a cylindrical head portion 15 having a diameter substantially equal to the root diameter of the threads 11. The insert is also formed with a pair of opposite keyways or grooves 16 extending downwardly from the head portion 15 through the threads 11, and the insert is provided with internal threads 18 (Fig. 5) for receiving a fastening element such as a bolt or screw to anchor the same in the parent body.

As shown in Fig. 4, the insert is adapted to be installed in the aperture 12 with the end of head portion 15 substantially flush with the surface 17 of the body 13. Preferably the counterbore 14 is of slightly greater depth than the length of the head portion 15 so that a short length of the external threads 11 are positioned within the counterbore whereby the top ends of the grooves 16 are exposed.

The insert 10 is adapted to be locked in position by a locking member including a ring portion 20 adapted to be received within the counterbore 14 concentrically of the insert head portion 15. Extending downwardly from ring portion 20 are a pair of keys 21 which are adapted to fit within the grooves 16. The locking member is seated by driving the same downwardly about the installed insert 10 so as to cause the keys 21 to pass downwardly into the grooves 16 and at the same time to cut keyways through the threads of the parent body whereby the locking member will be locked against rotation relative to the parent body and the insert in turn will be secured against rotation relative to the locking member and thus against rotation relative to the body. Inserts of this type are more fully described in my copending patent application Serial No. 373,172, filed August 10, 1953.

The tool for installing such inserts and locking members comprises an elongate body 25 preferably of hexagonal cross section as shown to facilitate the engagement of a wrench or to provide a grip for a hand. The body 25 is formed with an axial opening or bore 26 extending upwardly from what may conveniently be termed its bottom end. The sides of the body are tapered inwardly adjacent the bottom end thereof to facilitate observation of the lower end of the tool from above, the bottom end of the tool being formed, however, with an annular, planar driving surface 24 surrounding the bore 26. Slidably mounted in the bore 26 is an insert drive mandrel 27 including a cylindrical shank 28 which fits within the bore 26 and has a diameter at least as great as that of the head portion 15 of the inserts to be installed with the tool. A compression spring 29 is arranged between the mandrel shank 28 and the bore end to urge the mandrel outwardly of the bore. To secure the mandrel within the bore against the bias of the spring 29, the mandrel shank 28 is formed with a flat 30 thereon including an abrupt shoulder 31 at the upper end of the flat. A set screw 32 is threaded through the body 25 and projects inwardly of the bore 26 by a slight amount sufficient to engage the shoulder 31 so that the setscrew acts as a stop to prevent the spring 29 from ejecting the mandrel from the bore and holds the mandrel in a lower limit position as shown in Fig. 2. Preferably the setscrew is spaced from the surface of the flat 30 as shown in Fig. 5 so as to permit movement of the mandrel 27 upwardly relative to the body 25 from its lower limit position, as will be explained hereinafter. The setscrew 32 also prevents rotation of the mandrel relative to the body 25 so that by rotating the body 25 the mandrel may be driven. The lower end of the mandrel is of reduced diameter and is provided with threads 35 for engagement with the internal threads 18 of the insert 10. The flat 30 is formed on the mandrel shank such that when the shoulder 31 of the flat 30 engages the setscrew 32, the shoulder 36 defined between the shank 28 and the threaded end portion 35 is spaced from the driving surface 24 by a distance predetermined as will be explained. If the shank 28 is of normally larger diameter than the insert head portion 15, the portion of the shank extending below the body end 24 is turned to form a neck 37 of a diameter substantially equal to that of the head portion 15, as shown in Figs. 4 and 6.

As illustrated in Fig. 3, the locking member is adapted to be assembled on the tool with the ring portion 20 positioned about the neck 37. Means are provided for releasably securing the ring portion 20 on the neck 37 and adjacent the driving surface 24, such means comprising in the illustrated embodiment an elongate, resilient wire 38 mounted within a longitudinal groove 39 formed in the mandrel shank 28 and neck 37. The wire is held within the groove by a crimp 40 of the side walls thereof and is bent to cause a protuberant nose 41 to extend above the surface of the neck, thus to pressurably engage the ring portion 20 and releasably secure the same against the driving surface 24, as best shown in Fig. 6.

The flat 30 is formed on the shank 28 so that when the mandrel is in its lower limit position and the ring portion 20 is assembled on the neck 37 adjacent the driving surface 24 with the insert 10 screwed up against the shoulder 36, the lower ends of the keys 21 will be engaged in the upper end of the insert grooves 16, as shown in Fig. 3.

The method of using the tool is as follows: The locking member 20, 21 is assembled on the insert 10 and the insert screwed onto the mandrel until the head 15 of the insert abuts the mandrel shoulder 36. The locking member is then pulled upwardly onto the neck 37 until the ring portion 20 engages drive surface 24 of the body 25. In this position the lower ends of the keys 21 will still be engaged with the upper ends of the insert grooves 16, as shown in Fig. 3. The insert and tool are then positioned over the aperture 12 and the insert driven into the aperture by rotating the tool either by hand or by suitable power means until the insert is installed in the body with the upper end of the head 15 thereof substantially flush or slightly below the body surface 17, as shown in Fig. 4. This will ordinarily occur when the keys 21 engage the bottom of the counterbore 14. An axial load is then applied to the driver body 25 such as by tapping it with a hammer. The insert and the mandrel 27 will be held against axial displacement, of course, by reason of the engagement of the threads 11 of the insert with the threads 12 of the parent body. Thus, the body 25 will move axially relative to the mandrel and insert compressing the spring 29 to drive the locking member downwardly relative to the insert whereupon the keys 21 of the locking member will be driven downwardly into the insert grooves 16 simultaneously cutting keyways in the parent body, and the ring portion 20 will be seated about the insert head 15 within the counterbore 14 as shown in Fig. 5. When the locking member has been fully seated, the tool is removed by simply backing out the mandrel 27 from the insert. Release of the axial load upon the body 25 will permit the spring 29 to return the body to its normal position relative to the mandrel for assembling another insert and locking member thereon.

In Figs. 8 to 13, inclusive, is shown another embodiment of the invention particularly adapted for installing a stud such as shown in Fig. 7 and the locking member therefor. With particular reference first to Fig. 7, such a stud includes an externally threaded body portion 50 adapted to be threaded into a cooperatively threaded aperture 12 formed in a parent body 13 and provided with a counterbore 14 as described hereinbefore. The stud 49 is provided with a shank 51 which extends coaxially from the body portion 50 and which shank may be threaded as at 52 for receiving a threaded fastening element such as a nut (not shown). The shank 51 is of reduced diameter relative to the body portion 50, preferably being of a diameter less than the root diameter of the body portion 50. The body portion 50 is provided with a pair of keyways or grooves 53 similar to the grooves 16 formed in the insert 10, and the body portion 50 is adapted to be locked in place by a locking member as described in connection with the tubular insert 10. In this instance, the ring portion 20 of the locking member is received about the shank 51 which may be formed with a collar 54 adjacent the threaded portion 50 of a diameter substantially equal to the inner diameter of the ring 20 in the event that the shank 51 is of a diameter much less than that of the ring, whereby the ring will have a somewhat snug seating engagement with the shank. Studs of the type just described are also more fully shown and described in my copending application Serial No. 373,172, filed August 10, 1953.

The tool for installing the stud 49 comprises a tubular driver body 57 which may be knurled on its outer surface or shaped as desired for engagement with a wrench or driving tool. The interior of the body 57 comprises an upper cylindrical axial bore 58 of relatively large diameter and a lower bore section 59 of reduced diameter and defined in part by a short tubular projection 60. Mounted within the bore 58 is a collet means for holding the stud to drive the same into the aperture 12, the collet means comprising in this instance an outer cylindrical sleeve 61 arranged for sliding movement axially of the bore 58. The sleeve 61 is internally threaded and has threaded therein an externally and internally threaded sleeve or ferrule 62, the internal threads of which are adapted cooperatively to engage with the threads 52 of the stud shank. A jam nut or stop plug 63 is screwed into the outer sleeve 61 above the ferrule 62 and is screwed down tight against the ferrule to lock the same in position. Fitted into the top end of the driver body 57 is an end plug 64 secured in the body by a setscrew 65 threaded through the driver body and engaging in an aperture 66 formed in the plug 64. The outer end of the stop plug 64 may be formed with a hex head 67 for engagement by a wrench or similar drive tool. A coil spring 68 is disposed between the end plug 64 and the sleeve 61 so as to bias the sleeve downwardly against the shoulder 69 formed in the body between the bores 58, 59.

To secure the sleeve 61 against rotation relative to the body 57, the sleeve is formed with a flat 72 on the outer surface thereof and a setscrew 73 is threaded through the body 57 to project a slight distance inwardly of the bore 58, the screw being spaced from the surface of the flat by a slight distance to permit the sleeve to slide axially upwardly relative to the body but being adapted to engage the sleeve should it be rotated relative to the body.

Mounted on the projection 60 is a collet 75 formed with a plurality of integral fingers 76 adapted to encompass the locking member ring portion 20 and frictionally engage the same so as to hold the ring portion within the collet and against the lower end of the projection 60. The collet 75 is slidably mounted on the projection 60 for sliding movement axially thereof so that the fingers 76 can be extended beyond the lower end of the projection, as shown in Figs. 11 and 12, or retracted upwardly upon the projection, as shown in Fig. 13. The collet is secured to the projection 60 by means of a pin 77 fixed in the collet and sliding in a slot 78 formed in the projection.

The stud driving tool is used as follows: The locking member 20, 21 is mounted upon the stud 49 in locking position and the shank 51 of the stud then inserted through the bore 59 and threaded into the ferrule 62 until the end of the shank engages the stop plug 63 as shown in Fig. 11. The stud is then thrust inwardly of the body 57 until the key ring portion 20 engages the lower end of the projection 60. Such movement will, of course, cause the collet assembly within the body 57 to move upwardly relative to the body, compressing the spring 68. The collet 75 is then pushed downward relative to the projection 60 so that the collet fingers 76 engage the ring portion 20 whereupon the insert is released and the tension of the spring 68 forces the collet assembly downwardly until the sleeve 61 engages the body shoulder 69, as shown in Figs. 11 and 12. The key ring 20 will be retained by the collet 75 in engagement with the lower end or drive surface 74 of the projection 60. Preferably the ferrule 62 and stop plug 63 are so located in the sleeve 61 that when the stud and locking member are thus assembled on the tool, the lower ends of the key 21 will be engaged in the upper ends of the insert grooves 53, as shown in Figs. 11 and 12. The stud 49 is then positioned over the aperture 12 and threaded into the same by rotating the body 57 either by hand or by a tool, as desired. The rotation of the body 57 will, of course, impart rotation to the sleeve 61 and to the stud. The stud is threaded into the aperture until the threaded body 50 is virtually completely within the threaded portion of the aperture 12 but with a half thread pitch or so thereof above the bottom of the counterbore 14, as shown in Fig. 12, or until the keys 21 engage the bottom of the counterbore 14. An axial load is then applied to the driver body 57 as by striking with a hammer, which causes the driver body to move downwardly relative to the collet means and the insert 49, driving the locking member downwardly to locking position upon the stud as shown in Fig. 13. The collet 75 will engage the parent body surface 17 and stop as the locking member 20, 21 is driven downwardly whereby the ring portion 20 is driven out of the collet 75 as shown in Fig. 13. The tool may be removed from the stud by simply backing the tool off the stud shank.

It will be noted that the stud drive tool can be adapted for use with studs having shanks of various lengths by merely adjusting the position of the ferrule 62 and stop plug 63 within the sleeve 61 so that when the shank of the stud is drawn up against the stop plug 64, the threaded portion 50 of the stud will be located in its desired position from the end or drive surface 74 of the projection 60 as described hereinbefore.

From the foregoing it will be seen that in accordance with the present invention there is provided simple, inexpensive tools easily manipulated for installing inserts and studs and locking members of the type described and also that the principles are readily adapted for installing other threaded devices and key type locking members therefor.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A tool for installing a threaded device of the type having an externally threaded portion adapted to engage in a counterbored, tapped aperture in a parent body and for thereafter driving home a locking member including a ring portion receivable in said counterbore and keys extending from the ring portion adapted to be driven into longitudinal grooves formed through the external threads of said threaded device, and simultaneously to cut keyways through the threads of said parent body, said tool comprising a pair of bodies including an inner driving body having means for engaging said threaded device to mount the same on said inner body for threading of the device into said aperture, and an outer, locking member driving body arranged annularly of said inner body for sliding movement axially thereof, holding means on one of said bodies releasably to engage said locking member ring portion and hold the same in coaxial alignment with said threaded device and in spaced relation to said threaded device portion while said threaded device is installed, said outer body having a driving surface for engaging said ring portion to drive the same from the aforementioned holding means and home into locking engagement with said device after threading of the device into said parent body.

2. A tool for installing threaded devices of the type having an externally threaded portion adapted to engage in a tapped, counterbored aperture in a parent body and for thereafter driving home a locking member including a ring portion receivable in said counterbore and keys extending from the ring portion adapted to be driven into longitudinal grooves formed through the external threads of said threaded device, said tool comprising a tubular outer body and an inner body mounted in said outer body for sliding movement axially thereof between a first and a second position relative to one another, means on said inner body for engaging with said threaded device for mounting of the same coaxially upon said inner body for driving said threaded device into said body aperture, means on one of said bodies for releasably engaging and holding said locking member with the ring portion thereof coaxially of said threaded device, and with said locking member out of locking engagement with said threaded device when said inner body and said outer body are in said first position, drive means in said outer body to engage said locking member during movement of said bodies from said first position to said second position and to drive said locking member into locking position upon said threaded device, and resilient means operatively arranged between said inner and outer bodies yieldingly urging the same to said first position.

3. A tool for installing a tubular insert of the type having external threads adapted to engage in a tapped, counterbored aperture in a parent body and an unthreaded head portion adapted to be received in said counterbore, and for thereafter driving home an insert locking member including a ring portion receivable in the counterbore about said head portion and a pair of keys extending from the ring portion adapted to be driven into longitudinal grooves formed through the outer threads of said insert, said tool comprising a driver body having an axial opening from one end thereof, a drive mandrel including a shank mounted in said opening for reciprocal movement longitudinally of said body, means on said mandrel and said body for preventing rotation between said mandrel and said body, said mandrel extending outwardly of said body and having means on the outer end thereof engageable internally of said insert whereby said insert may be threaded into said aperture by rotating said tool, means on said mandrel for releasably retaining said locking member ring portion thereon adjacent said driver body end, and means including a resilient element operatively arranged between said mandrel and said body yieldingly urging said mandrel outwardly of said body to a limit position such that in said limit position said locking member keys are engaged in the upper end of said insert grooves, said driver body being adapted to drive said locking member home by applying an axial load to said body after installing the insert in said aperture whereby the body is moved downwardly relative to said mandrel and insert.

4. A tool for installing an internally threaded tubular insert having external threads for engaging in a tapped, counterbored aperture in a parent body and for thereafter driving home an insert locking member including a ring portion and a pair of keys extending from the ring portion adapted to be driven into longitudinal grooves formed through the threads of said insert, said tool comprising a driver body having an axial bore extending upwardly from the bottom end thereof, a drive mandrel mounted in said bore for reciprocal movement therein, said mandrel having threads on the lower end thereof engageable with the internal threads of said insert and a shoulder against which said insert is adapted to abut when the insert is threaded upon said mandrel, means on said mandrel for releasably retaining said locking member ring portion adjacent said driver body bottom end, means yieldingly urging said mandrel downwardly relative to said driver body to a limit position wherein the lower ends of said locking member keys are engaged in the upper ends of said insert grooves, cooperative means on said driver body and said mandrel for preventing rotation therebetween whereby said body may be rotated to thread said insert into an aperture and said driver body thereafter moved downwardly relative to said mandrel and insert to drive said locking member home into locking position relative to said insert.

5. A tool for installing an internally threaded tubular insert of the type having external threads adapted to engage in a tapped, counterbored aperture in a parent body and an unthreaded head portion adapted to be received in said counterbore and for thereafter driving home an insert locking member including a ring portion receivable in the counterbore about said head portion and a pair of keys extending from the ring portion adapted to be driven into longitudinal grooves formed through the external threads of said insert and simultaneously to cut keyways through the threads of said parent body, said tool comprising a driver body having an axial opening from one end thereof, a drive mandrel including a shank mounted in said opening for reciprocal movement longitudinally of said driver body, means for preventing rotation between said driver body and mandrel, spring means operatively arranged between said driver body and said mandrel to bias said mandrel outwardly of said driver body to a limit position, said mandrel having threads on the outer end thereof engageable with the internal threads of said insert and a shoulder against which the end of said insert head portion is adapted to be drawn when the insert is threaded upon said mandrel, said mandrel being formed with a cylindrical neck portion thereon between said threaded end and said shank of substantially the diameter of said insert head portion and adapted to receive said locking member ring portion, means on said neck portion for releasably retaining said ring portion adjacent said driver body end, said neck portion having a length such that with said mandrel in said limit position, said keys are engaged in the upper end of said insert grooves when said ring portion is assembled adjacent said driver body end, whereby said tool may be rotated to thread said insert into said aperture and an axial load thereafter applied to said driver body to drive said locking member into locking position relative to said insert.

6. A tool for installing stud inserts of the type having a threaded portion adapted to be threaded into a tapped, counterbored aperture in a parent body and a shank of reduced diameter extending coaxially from said threaded portion, and for thereafter driving home an insert locking member including a ring portion receivable in said counterbore and a pair of keys extending from the ring portion and adapted to be driven into longitudinal grooves in the periphery of said threaded portion, said tool comprising a hollow driver body open at one end thereof, an insert engaging member in said body arranged for sliding movement axially thereof, interengaging means on said body and insert engaging member to assure common rotation, said insert engaging member being formed to receive said insert shank and drivingly engage the same for screwing said insert into said tapped aperture, means on said driver body end defining a driving surface for engaging the ring portion of said locking member to drive the same home after installation of said insert in said aperture, and a locking member holding means on said body end for engaging and holding a locking member with said ring portion abutting said driving surface, said insert holding member having a first position in which said insert threaded portion is spaced from said driving surface a distance such that the ends of said keys engage in the upper ends of said insert grooves, and a second position in which said insert threaded portion is relatively retracted toward said driving surface whereby to force said keys into said grooves to drive said locking member home.

7. A tool for installing stud inserts of the type having a threaded portion adapted to be threaded into a tapped, counterbored aperture in a parent body and a shank portion of reduced diameter extending coaxially from said threaded portion, and for thereafter driving home an insert locking member including a ring portion receivable in said counterbore and a pair of keys extending from the ring portion and adapted to be driven into longitudinal grooves in the periphery of said threaded portion, said tool comprising a hollow driver body open at one end thereof, a collet means in said body arranged for sliding movement axially thereof, interengaging means on said body and collet means to assure common rotation, said collet means being formed to receive said shank portion and drivingly to engage the same for screwing said insert into said tapped aperture, said body having a coaxial, relatively short tubular projection on said one end thereof through which said shank portion is received, a collet slidably mounted on said projection for engaging and retaining. said locking member ring portion against the terminal end of said projection, said collet being retractable upon said projection, said collet means having a first position in which said insert threaded portion is spaced a predetermined distance from said driver body end such that the ends of said keys engage in the upper ends of said insert grooves, and a second position in which said insert threaded portion is retracted toward said driver body end whereby to force said keys into said grooves to drive said locking member home.

8. A tool for installing stud inserts of the type having a threaded portion adapted to be threaded into a cooperatively threaded counterbored aperture in a parent body and a threaded shank of reduced diameter extending coaxially from said threaded portion, and for thereafter driving home an insert locking member including a ring portion receivable in said counterbore and a pair of keys extending from the ring portion and adapted to be driven into longitudinal grooves in the periphery of said threaded portion, said tool comprising a tubular driver body open at one end thereof and a collet means mounted in said driver body for sliding movement axially thereof, means for preventing rotation of said collet means relative to said driver body, shoulder means on said driver body for engaging said collet means and determining a limit position in its movement toward said one end, a spring operatively arranged between said collet means and said driver body for biasing said collet means to said limit position, said collet means being internally threaded for engagement with the threads of said insert shank and having a stop member engageable by the end of the insert shank when the same is fully threaded into said bushing means whereby said insert may be screwed into said parent body aperture by rotating said tool, said driver body having a coaxial, relatively short tubular projection on said one end thereof through which said stud shank is received, the diameter of said projection being substantially equal to the diameter of said locking member ring portion, a collet slidably mounted on said projection for engaging and retaining said locking member ring portion against the terminal end of said projection, said collet being retractable upon said projection, said stop member being adapted to position said stud with the threaded portion thereof spaced from said projection terminal end by a distance such that with the locking member ring portion engaged in said collet the keys of said ring portion will engage in the upper ends of said insert grooves, the application of an axial load upon said driver body effecting movement thereof axially of said collet means and insert stud to drive said locking member home.

References Cited in the file of this patent

UNITED STATES PATENTS

| | | |
|---|---|---|
| 1,177,843 | Ackerman et al. | Apr. 4, 1916 |
| 1,746,326 | Tomkinson | Feb. 11, 1930 |
| 1,769,591 | McIntosh | July 1, 1930 |
| 2,438,744 | Flynn | Mar. 30, 1948 |
| 2,774,133 | Sitz | Dec. 18, 1956 |